United States Patent
Braat et al.

(10) Patent No.: US 10,171,018 B2
(45) Date of Patent: Jan. 1, 2019

(54) METHOD AND ELECTRONIC CIRCUIT FOR STALL DETECTION

(71) Applicant: Melexis Technologies NV, Tessenderlo (BE)

(72) Inventors: Marcel Jakobus Gerardus Braat, Best (NL); Marc Lambrechts, Kessel-lo (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 15/629,977

(22) Filed: Jun. 22, 2017

(65) Prior Publication Data

US 2017/0373623 A1 Dec. 28, 2017

(30) Foreign Application Priority Data

Jun. 22, 2016 (EP) .................... 16175839

(51) Int. Cl.
| H02H 7/08 | (2006.01) |
| H02P 8/38 | (2006.01) |
| H02P 6/28 | (2016.01) |
| H02P 8/22 | (2006.01) |
| H02P 8/36 | (2006.01) |

(52) U.S. Cl.
CPC ............... *H02P 8/38* (2013.01); *H02P 6/28* (2016.02); *H02P 8/22* (2013.01); *H02P 8/36* (2013.01)

(58) Field of Classification Search
CPC ..................................... H02P 8/38; H02P 6/28

USPC .................................................... 318/400.21
See application file for complete search history.

(56) References Cited

U.S. PATENT DOCUMENTS

| 5,963,005 A | 10/1999 | Yamaji |
| 7,453,230 B1 | 11/2008 | Kremin |
| 2006/0176007 A1 | 8/2006 | Best |
| 2006/0181237 A1 | 8/2006 | Arefeen et al. |
| 2015/0349686 A1 | 12/2015 | Stoeger |
| 2016/0013743 A1 | 1/2016 | Braat et al. |

FOREIGN PATENT DOCUMENTS

| DE | 102014210069 A1 | 12/2015 |
| EP | 0848259 A1 | 6/1998 |
| EP | 2966772 A1 | 1/2016 |

OTHER PUBLICATIONS

European Search Report from EP Application No. 16175839.6, dated Dec. 1, 2016.

*Primary Examiner* — Erick Glass
(74) *Attorney, Agent, or Firm* — Workman Nydegger

(57) ABSTRACT

A method for detecting stall of a multiphase motor operated in a sinusoidal micro-stepped mode. The method comprises: a) measuring at least one phase current and/or measuring the sum of all phase currents at regular time intervals synchronous with the micro-steps, b) calculating the difference between the measured phase current at a first moment and the measured phase current of the same phase at a previous moment and/or the difference between the measured sum of all phase currents at a first moment and the measured sum of all phase currents at a previous synchronous moment, c) analyzing the series of obtained current differences so as to generate a stall detection signal.

12 Claims, 5 Drawing Sheets

METHOD AND ELECTRONIC CIRCUIT FOR STALL DETECTION

FIELD OF THE INVENTION

The invention relates to the field of sensorless multi-phase motors which are driven using sinusoidal micro-stepping. More specifically, it relates to a method and circuit for detecting stall in such multi-phase motors.

BACKGROUND OF THE INVENTION

Stall detection aims at detecting if a motor is not rotating or is blocked. Prior art methods for stall detection in a synchronous multiphase motor are based on back electromotive force (BEMF) measurements. When a synchronous multiphase motor is driven in sine mode, the sinusoidal BEMF voltage increases in a linear way with the speed of the motor. When the motor speed goes from normal to zero this can be detected by monitoring the BEMF drop. In prior art solutions the BEMF voltage is measured by using one floating phase on which the BEMF voltage can be measured. This has, however, as disadvantage that this floating phase is not contributing to the motor power. Besides decreasing the motor power, this also causes unwanted or noisy torque ripples.

Therefore, solutions are sought for stall detection whilst driving all phases of the multiphase motor. US20160013743A1, for example, discloses a method for stall detection based on motor current increase during stall. However, this does not work in all cases. This method cannot be used for low-speed motors with low-BEMF level. The current increase due to the absence of the low-BEMF is too small for reliable detection.

In view of these stall detection problems, there is room for improved methods and circuits for stall detection of a multiphase motor which is driven using sinusoidal micro-stepping.

SUMMARY OF THE INVENTION

It is an object of embodiments of the present invention to provide a good method and a good circuit for detecting stall of a multiphase motor which is driven using sinusoidal micro-stepping.

The above objective is accomplished by a method and device according to embodiments of the present invention.

In a first aspect, embodiments of the present invention relate to a method for detecting stall of a multiphase motor operated in a sinusoidal micro-stepped mode, the method comprising:
measuring a phase current and/or measuring a sum of all phase currents at regular time intervals synchronous with the micro-steps,
calculating a difference between the measured phase current at a first moment and the measured phase current of the same phase at a previous synchronous moment and/or a difference between the measured sum of all phase currents at a first moment and the measured current of the corresponding phase and/or of the measured sum of all phase currents at a previous synchronous moment,
analyzing the series of obtained current differences so as to generate a stall detection signal.

It is an advantage of embodiments of the present invention that stall detection is possible without position sensors and without the need for a floating phase to measure the back electromotive force (BEMF). It is an advantage of embodiments of the present invention that stall detection is possible for motors at low speed with low-BEMF level and with low current level. Stall detection at these low speeds is improved by calculating the difference between the measured current of a phase at a first moment and the measured current of the same phase at a previous synchronous moment and/or by calculating the difference between the measured sum of all phase currents at a first moment and the sum of all phase currents at a previous synchronous moment and by analyzing the series of obtained current differences.

It is an advantage that methods and circuits for stall detection according to embodiments of the present invention are robust and failsafe for variations caused by for example temperature, supply voltage, motor load conditions.

In embodiments of the present invention, analyzing the series of obtained current differences comprises comparing the obtained current differences with a threshold value, and generating a stall detection signal when the threshold value has been crossed at least a predefined number of times during a predefined period of time.

It is an advantage of embodiments of the present invention that a simple comparison with a threshold value permits to perform stall detection. It is an advantage of embodiments of the present invention that the robustness is improved by introducing a predetermined number of threshold crossings during a predefined period of time before generating a stall detection signal.

In embodiments of the present invention the threshold value is obtained by calculating a fixed percentage of the average motor current.

It is an advantage of embodiments of the present invention that the threshold is dynamically changing over time depending on the average motor current. Thereby the accurateness of the stall detection is improved. In embodiments of the present invention the average motor current is calculated by calculating the moving-average over $2^n$ samples (120 degrees for 3-phase or 180 degrees for 2-phase/bipolar; n is an integer number). The moving-average can for example be calculated using the measured sum current, or it can for example also be calculated using the sum-of-phase currents.

In embodiments of the present invention the motor is a 2-phase motor and the delay between the previous synchronous moment and the first moment, of the same phase, is an even multiple of 90°.

In embodiments of the present invention the motor is a 3-phase motor and the delay between the previous synchronous moment and the first moment, of the same phase, is an even multiple of 60°. In general, for a motor with n phases, the delay is an even multiple of 360° divided by two times the number of phases (2×n), when taking samples of the same phase.

In a second aspect, embodiments of the present invention relate to an electronic circuit for detecting stall of a multiphase motor operated in a sinusoidal micro-stepped mode, the electronic circuit comprising,
at least one current sensor adapted for measuring a phase current and/or a current sensor for measuring the sum of all phase currents wherein the electronic circuit is adapted for measuring the current at regular time intervals synchronous with the micro-steps,
a differentiator adapted for calculating the difference between the measured phase current and the measured phase current of the same phase at a previous synchronous moment and/or the difference between the measured sum of all phase currents at a first moment and the measured sum of all phase currents at a previous synchronous moment, an analyzer for analyzing the series of obtained current differences so as to generate a stall detection signal.

In embodiments of the present invention the analyzer is adapted for comparing the series of obtained current differences with a threshold value and for generating a stall detection signal when the threshold has been crossed at least a pre-defined number of times during a pre-defined stall-width.

In embodiments of the present invention the threshold value is a fixed percentage of the average motor current.

In embodiments of the present invention the motor is a 2-phase motor and the electronic circuit is adapted for measuring the current with a delay between the previous synchronous moment and the first moment which is an even multiple of 90°.

In embodiments of the present invention the motor is a 3-phase motor and the electronic circuit is adapted for measuring the current with a delay between the previous synchronous moment and the first moment which is an even multiple of 60°.

In embodiments of the present invention the electronic circuit further comprises a motor-drive circuit and PWM generators for applying PWM signals for applying micro-stepped waveforms to the motor driver circuit.

In embodiments of the present invention the electronic circuit comprises means for measuring a supply voltage supplied to the motor driver circuit, and the PWM generators are configured to take into account the measured supply voltage such that the resulting current through the phase windings is independent of the supply voltage.

In a third aspect, embodiments of the present invention relate to a computer program product for executing a method according to embodiments of the first aspect of the present invention.

In a fourth aspect, embodiments of the present invention relate to a system comprising a multiphase motor and an electronic circuit, according to embodiments of the second aspect of the present invention, for detecting stall of said motor.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
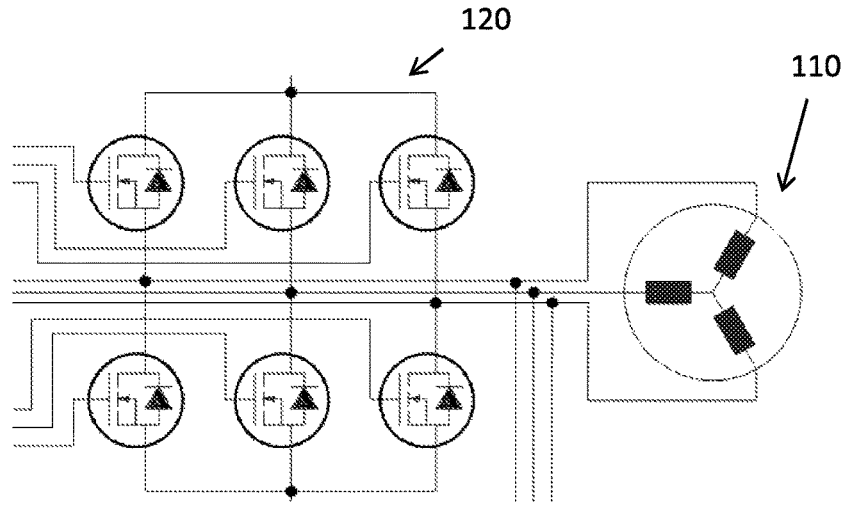
FIG. 1 shows a prior art 3-phase BLDC motor and a drive circuit for generating waveforms for driving the phase windings.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to the current of a phase, reference is made to the current through the phase winding of the multiphase motor.

Where in embodiments of the present invention reference is made to a first moment reference may be made to the actual moment. For example when a method for stall detection according to the present invention is running in real-time with the running motor, the first moment corresponds with the actual moment. In general referring to a first moment does not mean that this moment is the first moment in time but only distinguishes the first moment, qua naming, from the previous synchronous moment.

Where in embodiments of the present invention reference is made to a previous moment synchronous with a first moment, reference is made to a sample moment at the same phase angle in a period of the sinusoidal current as the first moment. The comparison can be made in the same phase, which is normally (e.g. during continuous operation mode when no stall occurs) 360 degrees divided by the number of phases back in time, or the comparison can be made with the current in a different phase which is normally 360 degrees divided by two times the number of phases back in time. For example in case of a two-phase/bi-polar motor the comparison in the same phase can be made with the current measured 180 degrees back in time (positive/negative current), and the comparison with the current in a different phase can be made 90 degrees back in time. When comparing current measurements between different phases it might be required to take care about coil imbalances or current measurement offsets per phase. This previous moment can be one period in the past or a plurality of periods back in time.

Where in embodiments of the present invention reference is made to a stall detection signal, reference is made to an indication that stall is detected. This can be by writing a pre-determined value in memory, by setting a bit line high or by any other type of indication.

Where in embodiments of the present invention reference is made to degrees presented as ' o ', reference is made to electrical degrees.

Embodiments of the present invention provide methods and electronic circuits for detecting stall of a synchronous multiphase motor. The motor may for example be a brushless direct current (BLDC) motor or a stepper motor.

The motor is driven in a sinusoidal micro-stepped mode. The micro-stepped sinusoidal waveforms may be applied as pulse width modulated signals to the motor drive circuit. Thereby the pulse width may be adapted depending on the supply voltage such that the desired phase current through the phase windings is achieved.

FIG. 1 shows the coils of a prior art 3-phase BLDC motor 110 and a prior art motor drive circuit 120 therefor. The drive circuit 120 typically is operated such that it applies phase shifted waveforms to the coils of the BLDC motor 110. These waveforms are typically micro-stepped waveforms which approximate a sinusoidal function. The number of steps per period of 360° may for example vary between 24 and 384. In embodiments of the present invention each full-step, wherein a full-step is 360 degrees divided by twice the number of phases, can be divided into a power of 2 (e.g. 2, 4, 8, 16, 32, 64) micro-steps.

In embodiments of the present invention the coil currents and/or the sum of all coil currents are measured, processed, and analyzed to detect the stall of a multiphase motor such as for example the motor of FIG. 1. It is thereby an advantage of methods and circuits according to the present invention that the dynamic current oscillations on top of the normal coil currents can be detected. These dynamic current oscillations are caused by the dynamic mechanical rotor oscillation when the rotor does not follow anymore the applied stator field. The rotor (mechanics) start shaking due to the mass-spring-effect wherein the mass is the mass of the rotor and wherein the spring is a magnetic force, which depends on the current-strength/amplitude. This mass-spring-effect causes a BEMF oscillation effect, which causes a coil/phase-current ripple/oscillation.

Figure 2:
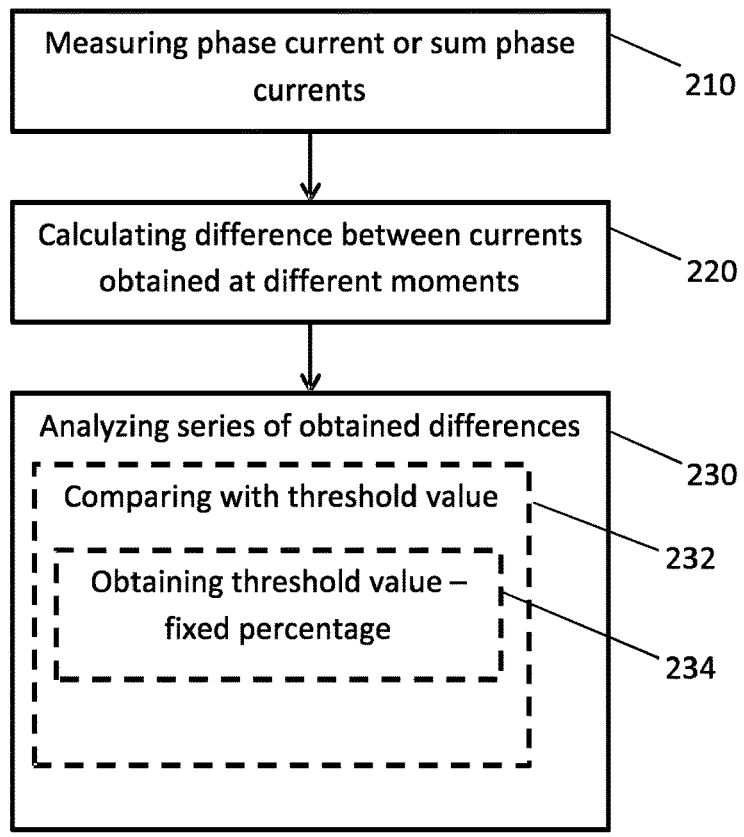
FIG. 2 is a flow chart of a method for detecting stall of a multiphase motor, in accordance with embodiments of the present invention.

In a first aspect the present invention provides a method for detecting stall of a multiphase motor such as the BLDC motor of FIG. 1 operated in a sinusoidal micro stepped-mode. FIG. 2 is a flow chart illustrating typical steps in a method according to embodiments of the present invention.

In a first step 210 the current through at least one of the phases and/or the sum of all phase currents is measured. This measurement is done at regular time intervals synchronous with the micro-steps and such that for each period current samples are taken at synchronous moments.

In micro-stepping the direction and the amplitude of the current through the phases is controlled so as to obtain smaller basic step angles. In full-step control, where only the direction of the current through the phase is controlled and not the amplitude, the basic step angle is equal to 360° divided by 2 times the number of phases. For example in a 2-phase motor the basic step angle in case of full-step control equals 90°. In micro-stepping, the basic step angle can be reduced to the basic step angle of full-step control divided by a power of two. As the basic step angles are reduced this leads to less operating noise compared to full-stepping.

In a next step 220 the difference between the measured current of a phase or of the measured sum of all phase currents at a first moment and the corresponding measured current at a previous synchronous moment is calculated. It is an advantage of embodiments of the present invention that this difference allows to detect the dynamic current oscillations caused by stall of the rotor. In embodiments of the present invention the obtained difference shows the amplitude of the dynamic current oscillations. As the current measurements are done synchronous with the micro-steps it is possible to compare the measured current with a measured current at a previous synchronous moment. Moreover, because of the synchronicity, in embodiments of the present invention, it is possible to define the sample moment(s) within a micro-step (e.g. at the beginning, in the middle or at the end of a micro-step). In embodiments of the present invention it is possible to select for which micro-steps the current is sampled on the condition that for each period the same (synchronous) samples are taken.

In a next step 230 the series of obtained current differences are analyzed so as to generate a stall detection signal. Analyzing may for example comprise averaging of the obtained current differences. It may comprise comparing the obtained differences with a threshold value. It may comprise correlating the obtained series of differences with an expected behavior during stall (e.g. a typical expected oscillation pattern). It may comprise any other statistical analysis so as to improve the detection sensitivity for dynamic current oscillations during stall.

Because the current measurements are done synchronous with the micro-steps it is possible to improve the detection sensitivity. This can be done by selecting the sample moment within a micro-step, as well as by selecting the micro-steps for which a current sample is taken.

FIG. 2 also shows an optional step 232 wherein analyzing the series of obtained differences comprises comparing them with a specified threshold. In embodiments of the present invention the threshold is obtained as a fixed percentage of the average motor current (see optional step 234 of FIG. 2). Thus an adaptive threshold is obtained which is dependent on the average motor current.

When the obtained difference goes above the specified threshold a potential stall has been detected. As the phase current or the sum of all phase currents can change over time due to normal torque variations, in embodiments of the present invention, stall is only indicated if the threshold has been crossed several times during a pre-determined period of time (a pre-defined stall-width). In embodiments of the present invention the threshold should have been crossed between 25% and 75% of the number of micro-steps within one full step.

In embodiments of the present invention the average motor current is obtained by calculating a moving sum over a number of samples (of phase currents or sum of all phase currents) of a multi-stepped waveform, wherein the period between the samples is an even multiple of 60°, in case of a three phase motor and wherein the period between the samples is an even multiple of 90°, in case of a two-phase motor (a two-phase motor is the same as a bi-polar motor).

In step 220 the current difference is measured between a current measured at a first moment and the current measured at a previous synchronous moment. In case of a 2-phase motor the delay between the previous synchronous moment and the first moment is 180°, or an even multiple of 90°. In case of a 3-phase motor the delay between the previous synchronous moment and the first moment is 120°, or an even multiple of 60°.

In a second aspect the present invention provides an electronic circuit for detecting stall of a multiphase motor operated in a sinusoidal micro-stepped mode. The electronic circuit must therefore comprise the components which are required for executing the method steps according to embodiments of the present invention. These different components may be implemented as separate components or as one integrated component, they may be a combination of analog and digital components. They may for example be partly implemented in a FPGA or in a microprocessor.

Figure 3:
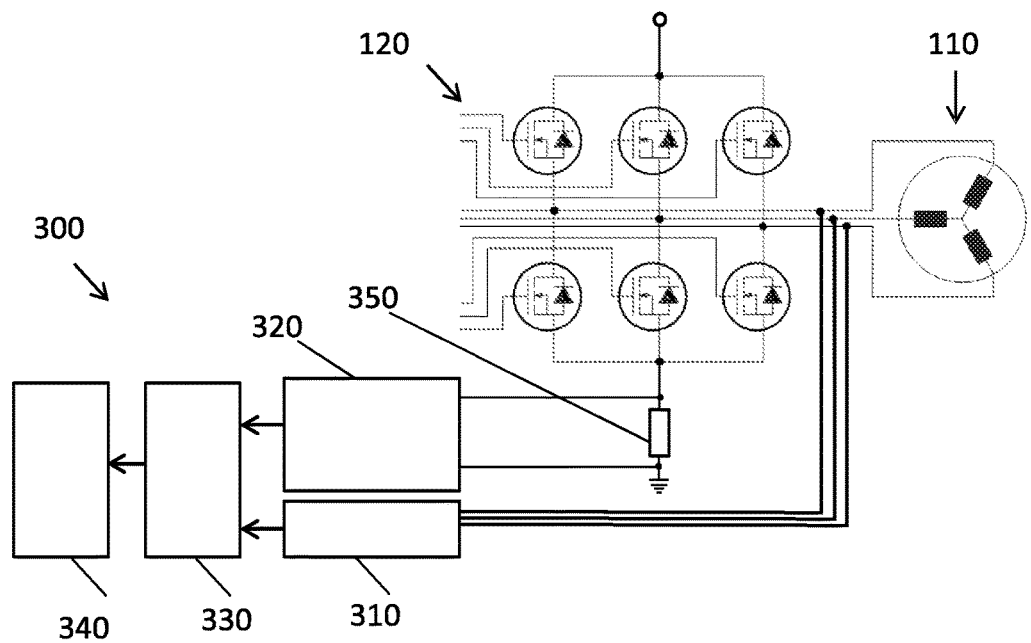
FIG. 3 shows an electronic circuit for detecting stall of a multiphase motor, in accordance with embodiments of the present invention.

A possible electronic circuit 300 according to embodiments of the present invention and integration thereof with a prior art BLDC motor is shown in FIG. 3. FIG. 3 shows a current sensor 310 for monitoring the phase currents through the coils of the BLDC motor 110 when the motor is driven by the motor drive circuit 120. The electronic circuit 300 of FIG. 3 also shows a current sensor 320 for obtaining the sum of all phase currents by measuring the voltage over a resistor 350. The currents are measured synchronous with the micro-steps. The measured currents are an input for the differentiator 330 which is adapted for calculating the difference between the measured current of a phase and the measured current of the same phase at a previous synchronous moment and/or for calculating the difference between the measured sum of all phase currents at a first moment and the sum of all phase current at a previous synchronous moment. FIG. 3 also shows an analyzer 340 for analyzing the series of obtained current differences so as to generate a stall detection signal.

Figure 4:
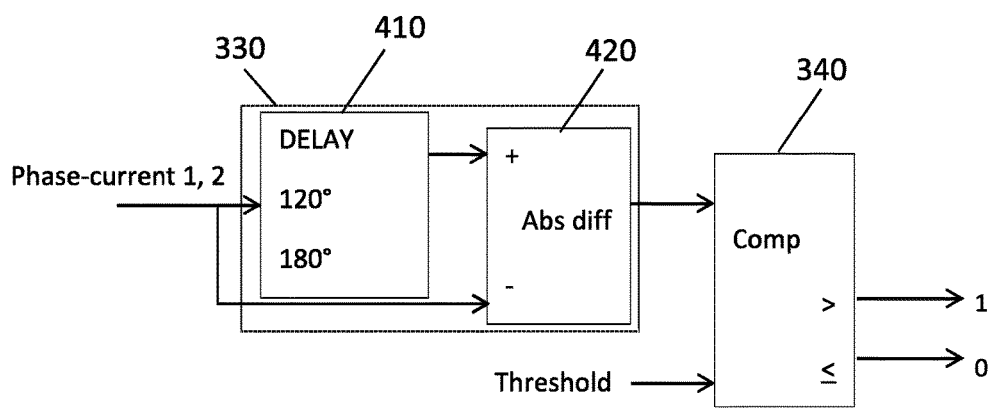
FIG. 4 shows components of an electronic circuit in accordance with embodiments of the present invention, as illustrated generally in FIG. 3.

FIG. 4 shows components of an electronic circuit 300 in accordance with embodiments of the present invention. It shows a differentiator 330 comprising a delay component 410 and a subtract component 420. The delay component 410 gets as input the series of measured currents and has as output a phase current at a first moment and a phase current at a previous synchronous moment. In case of a 2-phase motor the delay between the previous synchronous moment and the first moment is 180°, or an even multiple of 90°. In case of a 3-phase motor the delay between the previous synchronous moment and the first moment is 120°, or an even multiple of 60° (in the example of a 3-phase motor the sum current shape repeats every 120 degrees). The subtract component 420 makes the difference between the two currents from the delay component 410. In this example the analyzer 430 is a comparator which compares the obtained difference with a threshold and outputs a 1 if the obtained difference is higher than the threshold and 0 if the obtained difference is smaller than the threshold.

The following examples illustrate the signals of a multi-phase motor and the obtained signals when applying a method according to the present invention.

Figure 5:
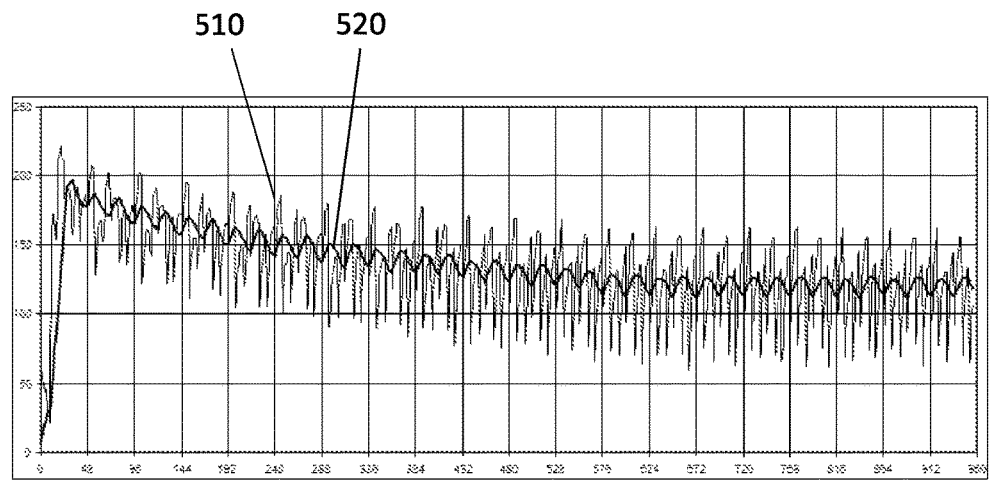
FIG. 5 shows the sum of all phase currents in function of sample number for a three-phase actuator.

FIG. 5 shows the sum of all phase currents in function of sample number for a three-phase actuator. Curve 510 shows all samples of the sum of all phase currents (one sample per micro-step). Curve 520 shows the moving average taken over 16 samples which, in this example, corresponds with 120 electrical degrees. This graph shows the current oscillation due to rotor oscillation.

Figure 6:
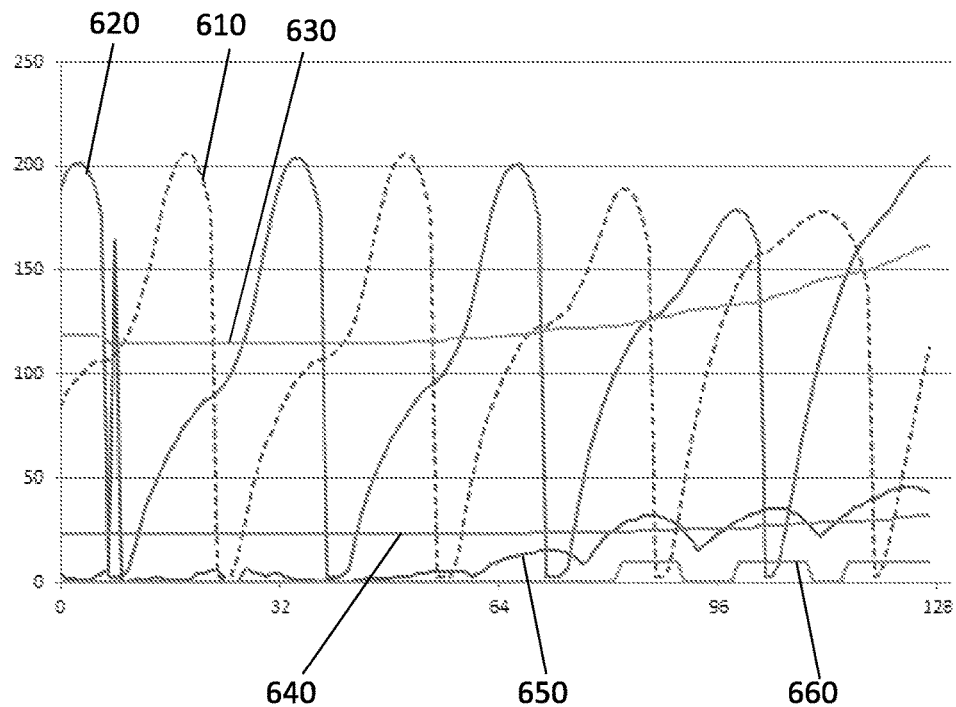
FIG. 6 shows phase currents and a stall indication signal obtained using a method or a circuit in accordance with embodiments of the present invention.

FIG. 6 shows the phase currents and the stall indication signal obtained using a method or a circuit in accordance with embodiments of the present invention. In this example the motor is a bipolar stepper motor and 64 micro-steps per 360° are applied. Curve 610 shows the coil current through a first phase. Curve 620 shows the coils current through a second phase. Curve 630 shows the average motor current which in this example is the moving average over 32 points of the sum of all phase currents. Curve 640 shows the threshold curve, which is in this example a fixed percentage of the average motor current (curve 630). In embodiments of the present invention the percentage is selected such that when no stall occurs the difference between the measured current at a first moment and the measured current at a previous synchronous moment is below the threshold curve 640 (except for exceptional circumstances such as a torque variation or a single oscillation above threshold) and such when stall occurs the difference is above the threshold curve 640. In embodiments of the present invention the percentage is between 20% and 80%. Curve 650 shows the difference between the measured current of a phase at a first moment and the measured current at a previous moment. In this case the delay between the first moment and the previous synchronous moment is 180 degrees back in time (2 times the number of micro-steps per full-step). Curve 660 has a zero value when the difference curve 650 is below the threshold curve 640 and a one value when the difference curve 650 is above the threshold curve 640. In embodiments of the present invention a stall detection signal is generated when the threshold has been crossed a predefined number of times during a pre-defined period of time. The period during which the difference is consecutively above the threshold is the stall width.

Figure 7:
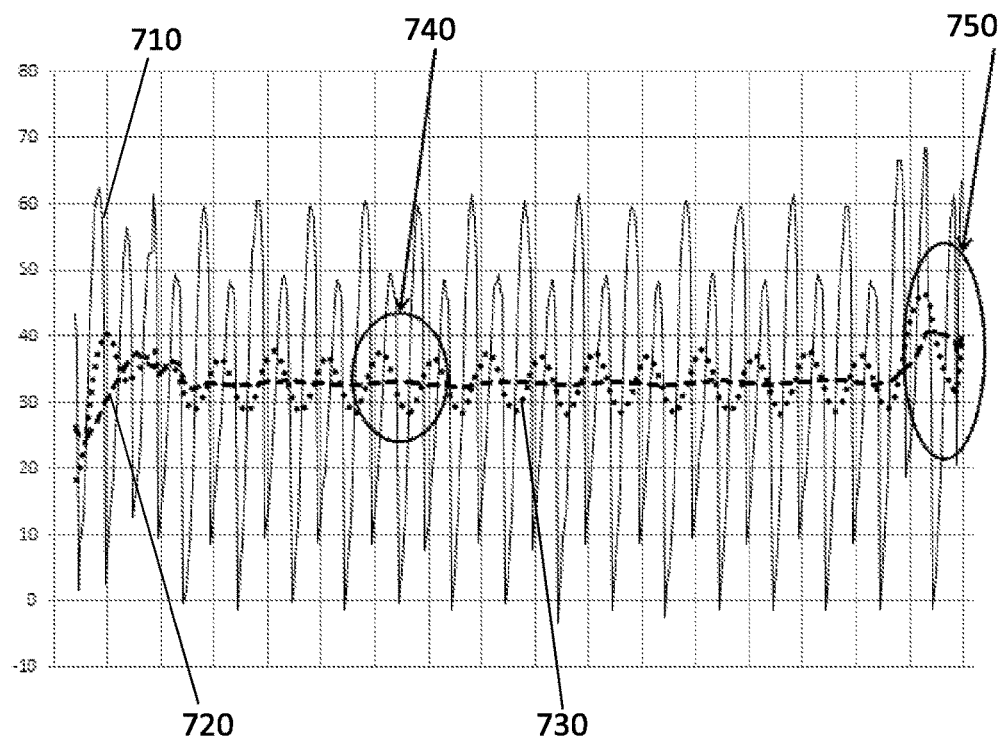
FIG. 7 illustrates oscillations in the sum of all phase currents in case of unbalanced motor coils in a bipolar stepper motor.

In terms of robustness, in embodiments according to the present invention, stall is preferably detected using phase currents instead of using the sum of all phase currents. The reason therefore being that the BEMF effect on the different coils (e.g. 2 coils) can be canceled in the sum of the phase currents, and/or that unbalanced coils can give false sum oscillations. FIG. 7 illustrates the oscillations in the sum of all phase currents in case of unbalanced motor coils in a bipolar stepper motor. Curve 710 shows the sum of all phase currents in function of sample number. Curve 730 is the 16 point moving average of curve 710 (the sum of all phase currents). A 16 points average corresponds with a rotation of 180°. Curve 720 is the 32 point moving average of curve 710 (the sum of all phase currents). A 32 points average corresponds with a rotation of 360°. As can be seen from curve 730 during the time window 740, oscillations are present in the sum of all phase currents, even in the absence of stall. The time window 750 shows the sum of all phase currents 720, the 16 point moving average 730, and the 32 points moving average 720 in the presence of stall.

Figure 8:
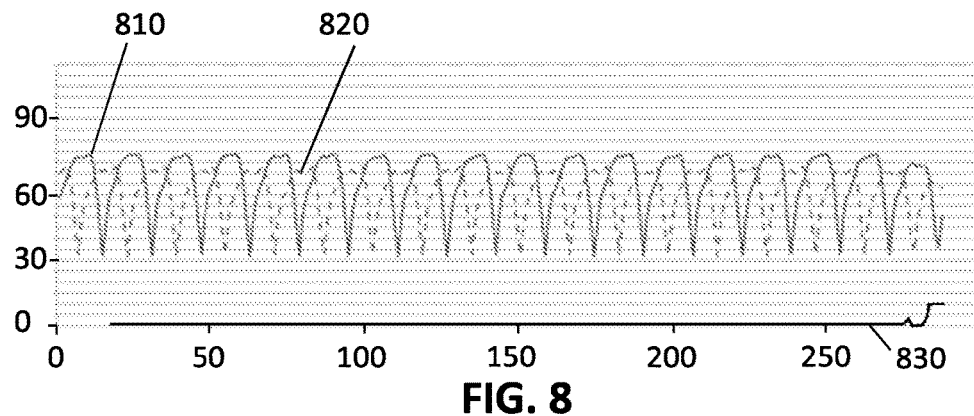
FIG. 8 shows a stall detection signal, in case the motor is running, obtained using a method or electronic circuit in accordance with embodiments of the present invention.
Figure 9:
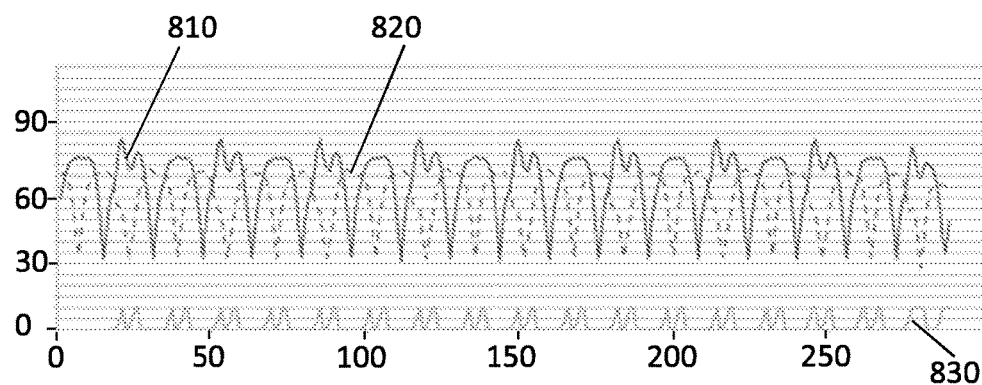
FIG. 9 shows a stall detection signal, obtained using a method and/or electronic circuit in accordance with embodiments of the present invention, in case the motor is stalled and a current oscillation is occurring in the current through the first coil.
Figure 10:
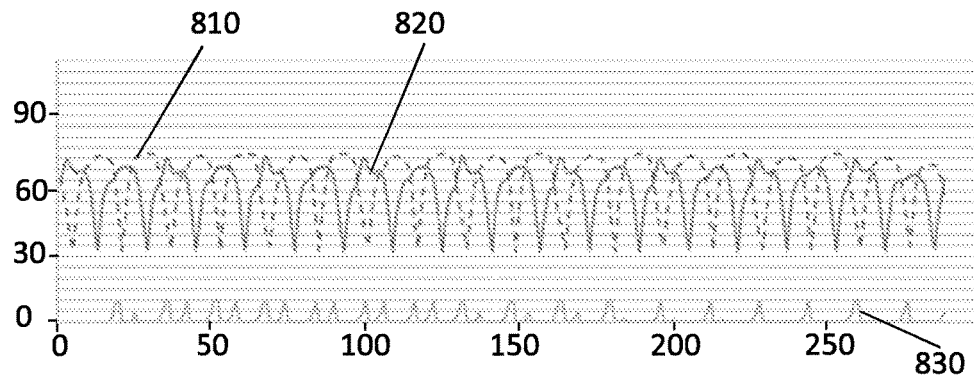
FIG. 10 show a stall detection signal, obtained using a method and/or electronic circuit in accordance with embodiments of the present invention, in case the motor is stalled and a current oscillation is occurring in the current through the second coil.

FIGS. 8, 9 and 10 show the stall detection signal obtained using a method or electronic circuit in accordance with embodiments of the present invention. The motor used in each of the three cases is a bipolar actuator with unbalanced coils. In each of the three cases 32 samples per 360° are taken. The top curves show the phase currents (current 810 through the first coil and current 820 through the second coil) in function of the sample number. The bottom curve 830 shows the curve resulting from comparing the current difference between the measured current of a phase at a first moment and the measured current at a previous synchronous moment and a threshold value. In this example the delay between the first moment and the previous synchronous moment is 180 degrees or 16 samples (32 samples per 360 degrees). When the difference is smaller than the threshold, the bottom curve 830 has a zero value. When the difference is smaller than the threshold, the bottom curve has a one value.

The curves in FIG. 8 correspond with a motor with a running rotor. The bottom curve 830 is at zero, indicating no stall is detected. Only at the end the curve 830 is different from zero. It is at this point that stall is detected.

The curves in FIG. 9 correspond with a motor when the rotor is stalled. The bottom curve 830 shows stall is detected four times per 360°. In this example only curve 810 corresponding to the current through the first coil shows current oscillation.

The curves in FIG. 10 correspond with a motor when the rotor is stalled. The bottom curve 830 shows stall is detected four times or two times per 360°. In this example only curve 820 corresponding to the current through the second coil shows current oscillation.

The invention claimed is:

1. A method for detecting stall of a multiphase motor operated in a sinusoidal micro-stepped mode, the method comprising:
   measuring a phase current and/or measuring a sum of all phase currents at regular time intervals synchronous with the micro-steps,
   calculating the difference between the measured phase current at a first moment and the measured phase current of the same phase at a previous synchronous moment and/or the difference between the measured sum of all phase currents at a first moment and the measured current of the corresponding phase and/or of the measured sum of all phase currents at a previous synchronous moment,
   analyzing the series of obtained current differences so as to generate a stall detection signal,
   wherein analyzing the series of obtained current differences comprises comparing the obtained current differences with a threshold value and generating a stall detection signal when the threshold value has been crossed at least a predefined number of times during a predefined period of time.

2. A method according to claim 1, wherein the threshold value is obtained by calculating a fixed percentage of the average motor current.

3. A method according to claim 1, wherein the motor is a 2-phase motor and wherein the delay between the previous synchronous moment and the first moment is an even multiple of 90°.

4. A method according to claim 1 wherein the motor is a 3-phase motor and wherein the delay between the previous synchronous moment and the first moment is an even multiple of 60°.

5. An electronic circuit for detecting stall of a multiphase motor operated in a sinusoidal micro-stepped mode, the electronic circuit comprising,
   at least one current sensor adapted for measuring a phase current and/or a current sensor for measuring the sum of all phase currents wherein the electronic circuit is adapted for measuring the current at regular time intervals synchronous with the micro-steps,
   a differentiator adapted for calculating the difference between the measured phase current and the measured phase current of the same phase at a previous synchronous moment and/or the difference between the measured sum of all phase currents at a first moment and the measured sum of all phase currents at a previous synchronous moment,
   an analyzer for analyzing the series of obtained current differences so as to generate a stall detection signal,
   wherein the analyzer is adapted for comparing the series of obtained current differences with a threshold value and for generating a stall detection signal when the threshold has been crossed at least a pre-defined number of times during a pre-defined stall-width.

6. An electronic circuit according to claim 5, wherein the threshold value is a fixed percentage of the average motor current.

7. An electronic circuit according to claim 5, wherein the motor is a 2-phase motor and wherein the electronic circuit is adapted for measuring the current with a delay between the previous synchronous moment and the first moment which is an even multiple of 90°.

8. An electronic circuit according to claim 5, wherein the motor is a 3-phase motor and wherein the electronic circuit is adapted for measuring the current with a delay between the previous synchronous moment and the first moment which is an even multiple of 60°.

9. An electronic circuit according to claim 5, the electronic circuit further comprising a motor-drive circuit and PWM generators for applying PWM signals for applying micro-stepped waveforms to the motor driver circuit.

10. An electronic circuit according to claim 9, the electronic circuit comprising means for measuring a supply voltage supplied to the motor driver circuit, and wherein the PWM generators are configured to take into account the measured supply voltage such that the resulting current through the phase windings is independent of the supply voltage.

11. A system comprising a multiphase motor and an electronic circuit according to claim 5 for detecting stall of said motor.

12. A computer-readable medium having stored thereon executable instructions that when executed by one or more processors configure a computer system to perform a method for detecting stall of a multiphase motor operated in a sinusoidal micro-stepped mode, said method comprising at least the following:

measuring a phase current and/or measuring a sum of all phase currents at regular time intervals synchronous with the micro-steps, calculating the difference between the measured phase current at a first moment and the measured phase current of the same phase at a previous synchronous moment and/or the difference between the measured sum of all phase currents at a first moment and the measured current of the corresponding phase and/or of the measured sum of all phase currents at a previous synchronous moment, analyzing the series of obtained current differences so as to generate a stall detection signal, wherein analyzing the series of obtained current differences comprises comparing the obtained current differences with a threshold value and generating a stall detection signal when the threshold value has been crossed at least a predefined number of times during a predefined period of time.

* * * * *